(12) United States Patent
Mullins

(10) Patent No.: US 6,386,043 B1
(45) Date of Patent: May 14, 2002

(54) LATERAL MOTION SENSING ASSEMBLY

(75) Inventor: Austin Gray Mullins, Odessa, FL (US)

(73) Assignee: University of South Florida

( * ) Notice: Subject to any disclaimer, the term of this patent is extended or adjusted under 35 U.S.C. 154(b) by 0 days.

(21) Appl. No.: 09/335,140

(22) Filed: Jun. 17, 1999

Related U.S. Application Data

(63) Continuation-in-part of application No. 09/224,662, filed on Dec. 31, 1998.
(60) Provisional application No. 60/070,362, filed on Jan. 2, 1998.

(51) Int. Cl.$^7$ ............... G01B 5/30; G01B 7/16; G01L 1/00; G01N 3/00
(52) U.S. Cl. ............... 73/760; 73/784; 73/786
(58) Field of Search ............... 73/784, 587, 760, 73/786, 804

(56) References Cited

U.S. PATENT DOCUMENTS

| | | |
|---|---|---|
| 2,121,614 A | 6/1938 | Stark |
| 2,497,990 A | 2/1950 | Huber et al. |
| 2,578,236 A | 12/1951 | Fredd |
| 2,680,913 A | 6/1954 | Johnston et al. |
| 2,708,316 A | 5/1955 | Fredd |
| 3,500,549 A | 3/1970 | Smith |
| 3,934,465 A | 1/1976 | Hanson |
| 3,939,570 A | 2/1976 | Loftus |
| 4,461,171 A | 7/1984 | de la Cruz |
| 4,956,999 A * | 9/1990 | Bohannan et al. ............ 73/587 |
| 5,038,622 A | 8/1991 | Tijmann |
| 5,337,613 A * | 8/1994 | Kovari ............ 73/784 |
| 5,377,548 A | 1/1995 | Ballivy |
| 5,404,757 A * | 4/1995 | Soulard ............ 73/784 |
| 5,511,429 A * | 4/1996 | Kosugi et al. ............ 73/784 |

\* cited by examiner

Primary Examiner—Max Noori
Assistant Examiner—Andre Allen
(74) Attorney, Agent, or Firm—Howard & Howard

(57) ABSTRACT

A lateral motion sensing assembly for sensing movement experienced by a structural member such as a support beam or driven pile. The sensing assembly is immersed within a casing which is mounted to the structural member. The sensing assembly includes a support body and an accelerometer mounted to the support body for measuring movement of the structural member. The accelerometer is aligned with an anticipated line of motion such that measurements can be made along this line of motion. A pair of lever arms are pivotally mounted to the support body for removably securing the support body within the casing. A spring is mounted between the support body and lever arms for continuously biasing the lever arms to a position perpendicular with the support body.

21 Claims, 3 Drawing Sheets

LATERAL MOTION SENSING ASSEMBLY

RELATED APPLICATION

This patent application is a Continuation-in-part of U.S. Ser. No. 09/224,662 filed on Dec. 31, 1998 and entitled "Load Sensor Assembly". This patent application also claims priority to and all the benefits of U.S. Provisional Patent Application Ser. No. 60/070,362 filed on Jan. 2, 1998 and entitled "Below Ground Load Sensor Assembly".

TECHNICAL FIELD

The subject invention relates to dynamic motion sensors which can be mounted to a structural member to continuously monitor and record the lateral movement of the structural member. The structural member is typically a load bearing support such as a driven pile or shaft, but the device can also be used directly in soil where an inclinometer casing has been installed.

BACKGROUND OF THE INVENTION

During the testing phase of building or bridge construction, lateral (horizontal) forces are applied to foundations installed deep into the ground to test structural performance. Currently, measurements of lateral displacements below the ground surface can only be recorded for static load tests. During these static load tests, forces are incrementally and constantly imparted on the foundation. The lateral movement is typically measured by measuring and sensing devices such as strain gages or other displacement mechanisms such as inclinometers. One such example of a strain gage measurement device is disclosed in U.S. Pat. No. 3,500,549 to Smith. The Smith '549 patent does not teach of using an accelerometer to measure dynamic movement.

A profile of deflected reinforced concrete foundations cannot usually be generated from strain gages. This is primarily due to the changing moment of inertia after tension cracks form in the concrete. Further, inclinometers cannot take measurements at a fast enough rate to record dynamic displacements. Hence, during dynamic tests, e.g. ship impact simulations, only the portion of the foundation above ground can be instrumented and monitored for displacement.

In addition, the prior art, including the Smith '549 patent, does not include an adjustable orientating device which allows the measuring and sensing device to be inserted into a variety of different sized holes. In other words, the prior art measuring and sensing devices are only designed for a specific size opening.

Accordingly, there is a need for a motion sensor that can be used to continuously measure and record the lateral motion of deep foundations, e.g. driven piles or shafts, during transient dynamic loads. In addition, there is a need for a motion sensor which is versatile enough to conform to a variety of different sized openings or cavities.

SUMMARY OF THE INVENTION

A lateral motion sensing assembly for sensing movement experienced by a structural member. The sensing assembly comprises a support body and a measuring device mounted to the support body for measuring movement of the structural member. The assembly is characterized by at least one lever arm pivotally mounted to the support body for removably securing the support body to the structural member. The measuring device is an accelerometer mounted to the support body between the lever arms and aligned with an anticipated line of motion for measuring movement of the structural member along the line of motion.

Accordingly, the subject invention provides for a below ground motion sensor that can be used and reused to continuously measure and record the lateral motion of deep foundations. In addition, the subject invention provides a versatile motion sensor which may be inserted into a variety of different shaped or sized cavities.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
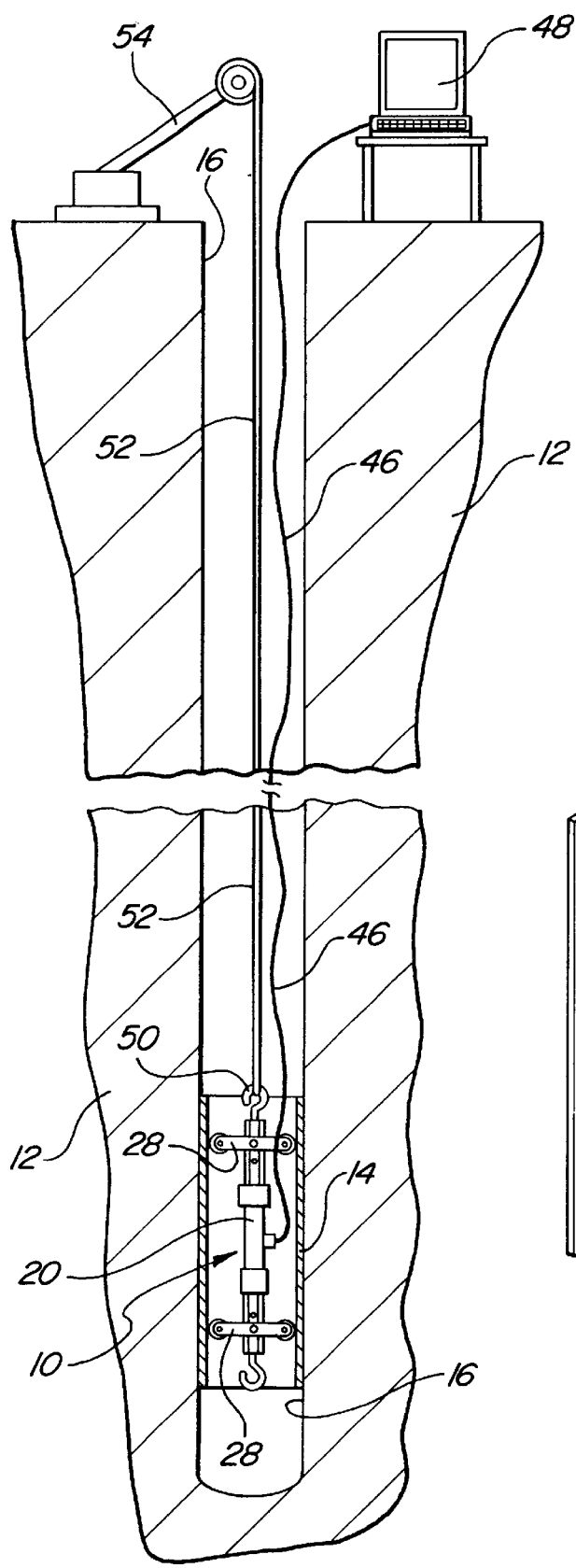
FIG. 1 is a partially cross-sectional side view of the subject invention inserted into a below ground foundation.
Figure 2:
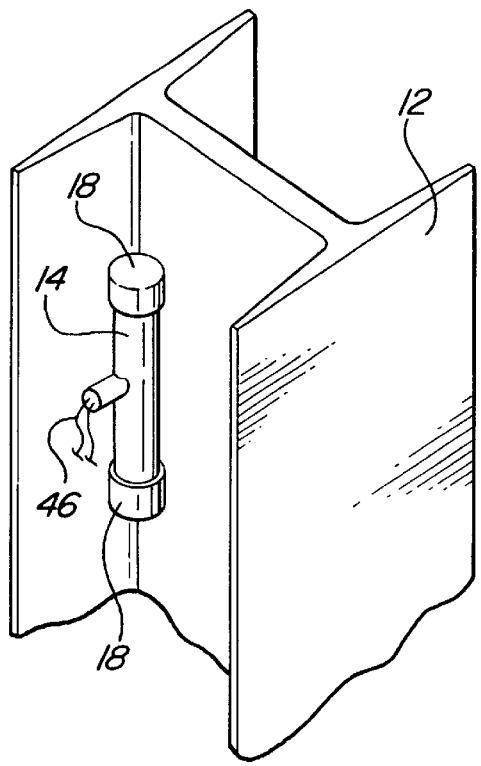
FIG. 2 is a perspective view of the subject invention installed to a structural I-beam.

Referring to the Figures, wherein like numerals indicate like or corresponding parts throughout the several views, a lateral motion sensing assembly is generally shown at 10. The motion sensing assembly 10 senses movement experienced by a structural member 12. As shown in FIG. 1, the structural member 12 is a below ground foundation 12. As shown in FIG. 2, the structural member 12 is a structural I-Beam 12. As appreciated by those skilled in the art, the structural member 12 may be any type of building or bridge support or the like. Additionally, the casing 14 can simply be supported by soil.

As also shown in FIGS. 1 and 2, the sensing assembly 10 is preferably housed within a casing 14 wherein the casing 14 is fixedly secured to the structural member 12. Preferably, the casing 14 has a length similar to the length of the sensing assembly 10. As appreciated, the casing 14 may be of any suitable size or length depending upon the particular application. As shown in FIG. 1, the casing 14 may be placed within a cavity 16 defined by the below ground foundation 12 at a desired depth. Of course the casing 14 may extend along the entire length of the cavity 16. The sensing assembly 10 is then lowered through the cavity 16 and into the casing 14. As shown in FIG. 2, the casing 14 may be mounted to the outside of the structural member 12 by any suitable means. The sensing assembly 10 is placed into the casing 14 and then end caps 18 are placed over the open ends of the casing 14 such that the sensing assembly 10 is encapsulated within the casing 14. As will be discussed in greater detail below, the casing 14 provides certain advantages for the sensing assembly 10. However, the sensing assembly 10 may be disposed directly within the cavity 16, hole or bent portion in the structural member 12 without deviating from the overall scope of the subject invention.

Figure 3:
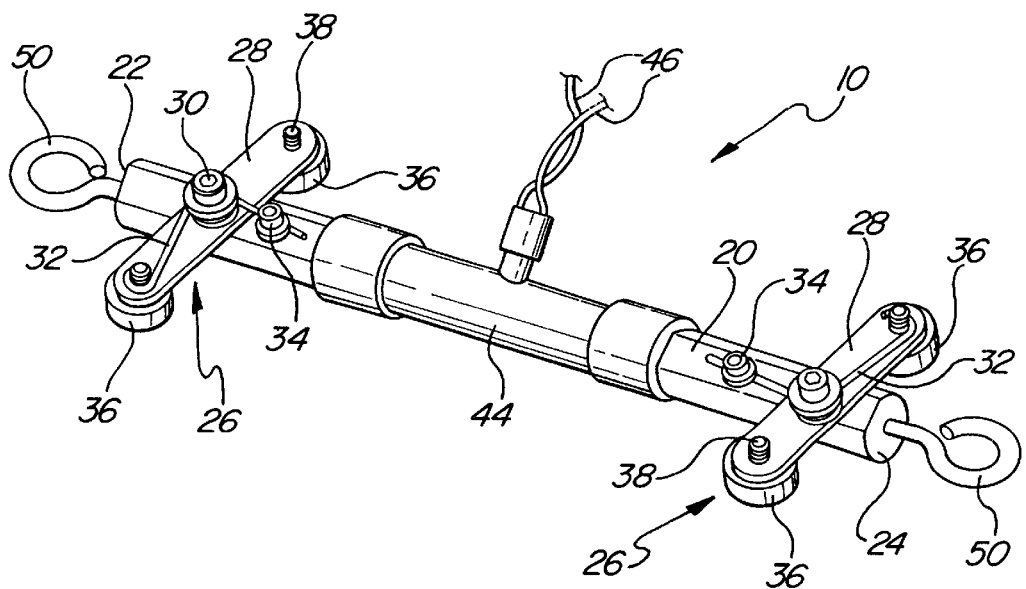
FIG. 3 is a perspective view of the subject invention.
Figure 4:
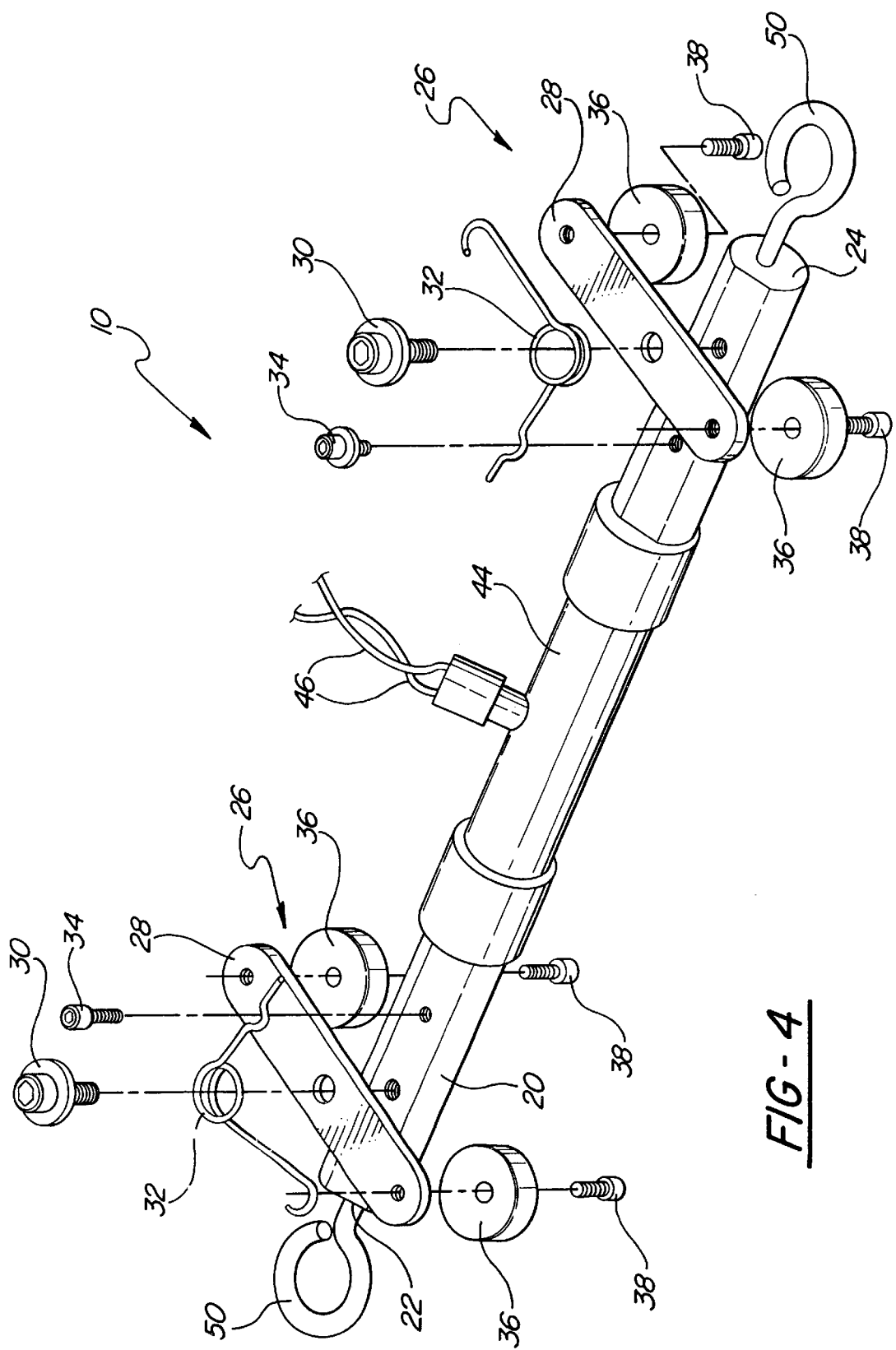
FIG. 4 is an exploded perspective view of FIG. 3 detailing many components of the subject invention.

Referring also to FIGS. 3 and 4, the motion sensing assembly 10 comprises a cylindrical support body 20 preferably formed of aluminum having first 22 and second 24 distal ends. At least one orientating device, generally shown at 26, is mounted to the support body 20. Preferably, an orientating device 26 is mounted to each distal end 22, 24 of the support body 20 for removably securing the support body 20 to the structural member 12. Even more preferably, the orientating devices 26 are lever arms 28 pivotally mounted to the distal ends 22, 24 of the support body 20. The lever arms 28 are connected to the support body 20 by a corresponding bolt 30.

A biasing device 32 has a first end mounted to the support body 20 and a second end mounted to a corresponding lever arm 28 for continuously biasing the lever arm 28 to a position substantially perpendicular with the support body 20. Specifically, the biasing device 32 is a coiled spring 32 coiled around each bolt 30 with the first end abutting a bolt 34. The bolt 34 is mounted to the support body 20 just below the bolt 30 of each lever arm 28. The bolt 30 forms a fulcrum and the bolt 34 acts as a fixed reaction point for the spring to 32. The lever arms 28 are therefore continuously biased at an angular orientation with respect to the support body 20. Preferably, the second end of one spring 32 abuts one side of one of the lever arms 28 and the second end of the other spring 32 abuts the other side of the other lever arm 28. Hence, one lever arm 28 is biased in a clockwise direction and the other lever arm 28 is biased in a counter clockwise direction. Having the lever arms 28 biased in opposite directions assists in centering the support body 20 within the casing 14.

Wheels 36 are mounted to each distal end of the lever arms 28 for providing rolling movement between the support body 20 and the casing 14. The wheels 36 include precision bearings (not shown) and are mounted to the lever arms 28 by a corresponding pin 38. The wheels 36 allow the motion sensor to travel smoothly within the casing 14. As discussed above, the casing 14 may be eliminated wherein the wheels 36 ride within the cavity 16 itself. The wheels 36 allow the motion sensing assembly 10 to be repeatedly reused wherein the motion sensing assembly 10 can be installed at the time of testing and then subsequently removed.

Figure 5:
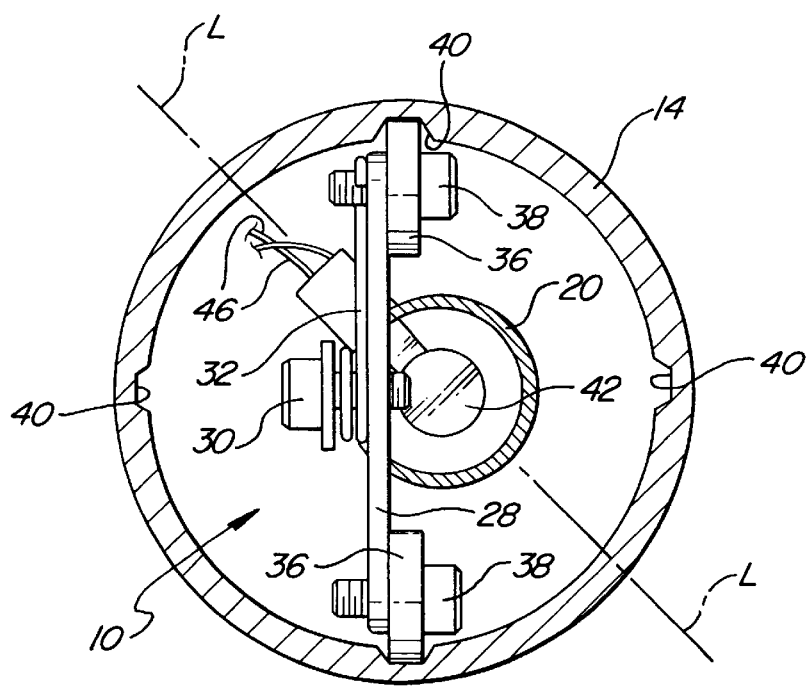
FIG. 5 is a partially cross-sectional view of the subject invention installed within a casing.

Referring also to FIG. 5, the casing 14 preferably has a tubular configuration and at least one pair of notches 40. The wheels 36 ride within the notches 40 to maintain a desired alignment of the support body 20. As shown there are two pairs of notches 40 disposed at opposite positions within the inner surface of the casing 14. As appreciated there may be any number of notches 40 disposed within the entire inner circumference of the casing 14. The springs 32 bias the lever arms 28 which in turn continuously biases the wheels 36 against the notches 40 to maintain the correct alignment. The casing 14, and subsequently the notches 40, may be mounted in a particular orientation. Hence, the motion sensing assembly 10 installed within the casing 14 may be orientated to measure along an anticipated line of motion L, such as a compass direction. The motion sensing assembly 10 maintains this orientation while disposed within the casing 14 and as it descends down to the desired depth for the measurements. The lever arms 28 and wheels 36 can preferably retract to accommodate a casing 14 or cavity 16 diameter of two (2) inches and can expand to a maximum usable diameter of three and one half (3½) inches. As appreciated, the lever arm 28, wheels 36 and support body 20 may be of any suitable size or configuration so long as the motion sensing assembly 10 is adequately retained within the casing 14 or cavity 16 in the structural member 12.

As shown in FIG. 5, a measuring device 42 is mounted to the support body 20 for measuring movement of the structural member 12. Preferably, the measuring device 42 is an accelerometer 42 aligned with the anticipated line of motion L. As appreciated by those skilled in the art, the accelerometer 42 is shown schematically and may be of any suitable design. The accelerometer 42 is mounted to the support body 20 between the lever arms 28 and aligned with the anticipated line of motion L for measuring movement of the structural member 12 along the line of motion L. The accelerometer 42 is mounted to an adjustable collar 44 on the support body 20 by any suitable device (not shown). The accelerometer 42 can therefore be rotated relative to the support body 20 into a variety of alignments. As discussed above, the notches 40 within the casing 14 maintain the correct orientation of the support body 20. Hence, the correct orientation or alignment of the accelerometer 42 is also maintained. Specifically, the wheels 36, light-weight aluminum support body 20, and stiff springs 32 firmly secure the accelerometer 42 in the desired orientation even during abrupt lateral motion.

Electrical wires 46 are connected to the accelerometer 42 and extend outwardly from the support body 20 for transmitting measurements. Specifically, the electrical wires 46 are attached to a high-speed data acquisition computer 48 (shown schematically in FIG. 1). The computer 48 monitors, records and measures the movement experienced by the accelerometer 42 to determine the lateral motions of the structural member 12 during short duration transient loads, e.g. simulated ship impacts.

At least one hook 50 is mounted to one of the first 22 and second 24 distal ends of the support body 20. As shown there is a hook 50 mounted to both of the first 22 and second 24 distal ends of the support body 20. As shown in FIG. 1, a support cable 52 is mounted to the hook 50 for guiding and supporting the support body 20 as the support body 20 is removably secured to the casing 14 within the cavity 16. A crane 54 or similar device is mounted to the cable 52 such that the motion sensing assembly 10 can be guided down into the cavity 16 and/or casing 14, or it can be lowered manually.

Obviously, many modifications and variations of the present invention are possible in light of the above teachings. It is, therefore, to be understood that within the scope of the appended claims the invention may be practiced otherwise than as specifically described.

What is claimed is:

1. A lateral motion sensing assembly for sensing movement experienced by a structural member, said assembly comprising;

a support body;

a measuring device mounted to said support body for measuring movement of the structural member;

at least one lever arm pivotally mounted to said support body for removably securing said support body to the structural member; and a casing having an inner surface with at least one indentation formed within said inner surface, said casing adapted to be fixed in a relationship proximal with said structural member and selectively encompassing said support body wherein said lever arm selectively engages said indentation to maintain a desired orientation of said support housing thereby maintaining a desired alignment of said measuring device.

2. An assembly as set forth in claim 1 further including a biasing device having a first end mounted to said support body and a second end mounted to said lever arm for continuously biasing said lever arm to a position substantially perpendicular with said support body.

3. An assembly as set forth in claim 2 wherein said biasing device is a coiled spring.

4. An assembly as set forth in claim 2 further including a first lever arm mounted to a first end of said support body and a second lever arm mounted to a second end of said support body with said measuring device disposed between said first and second lever arms.

5. An assembly as set forth in claim 4 wherein said measuring device is an accelerometer aligned with an anticipated line of motion for the structural member.

6. An assembly as set forth in claim 5 further including electrical wires connected to said accelerometer and extending outwardly from said support housing for transmitting measurements.

7. An assembly as set forth in claim 4 wherein said support body has a tubular configuration with at least one hook mounted to one of said first and second distal ends of said support body.

8. An assembly as set forth in claim 7 further including a support cable mounted to said hook for guiding and supporting said support body as said support body is removably secured to the structural member.

9. An assembly as set forth in claim 1 wherein said casing has a tubular configuration.

10. An assembly as set forth in claim 4 wherein each of said first and second lever arms include outwardly extending distal ends with a wheel mounted to each of said distal ends of said lever arms for providing sliding movement between said support body and said casing.

11. An assembly as set forth in claim 10 wherein said casing includes a pair of indentations being further defined as notches formed within said casing with said wheels riding within said notches to maintain a desired alignment of said support housing.

12. An assembly as set forth in claim 4 wherein said casing includes a pair of indentations with said first and second lever arms engaging said indentations to further maintain said desired orientation of said support housing and said desired alignment of said measuring device.

13. A lateral motion sensing assembly for sensing stresses imparted onto a structural member, said assembly comprising;

a support body having first and second distal ends;

an orientating device mounted to each distal end of said support body for removably securing said support body proximal to the structural member, said orientating devices being further defined as lever arms mounted to said distal ends of said support body with said lever arms being continuously biased outwardly away from said support body; and an accelerometer mounted to said support body between said lever arms and aligned with an anticipated line of motion for measuring movement of the structural member along said line of motion.

14. An assembly as set forth in claim 13 further including a pair of biasing devices having first ends mounted to said support body and second ends mounted to said lever arms for continuously biasing said lever arms to a position substantially perpendicular with said support body.

15. An assembly as set forth in claim 13 further including a casing encompassing said support body wherein said casing is fixedly secured to the structural member.

16. An assembly as set forth in claim 15 wherein said casing includes an inner surface with a pair of indentations formed within said inner surface wherein said lever arms selectively engage said indentations to maintain a desired orientation of said support housing thereby maintaining said desired alignment of said accelerometer with said anticipated line of motion.

17. An assembly as set forth in claim 16 wherein each of said first and second lever arms include outwardly extending distal ends with a wheel mounted to each of said distal ends of said lever arms for providing rolling movement between said support body and said casing.

18. An assembly as set forth in claim 17 wherein said pair of indentations are further defined as notches formed within said casing with said wheels riding within said notches to maintain a desired alignment of said support housing.

19. An assembly as set forth in claim 15 wherein said casing has a tubular configuration.

20. An assembly as set forth in claim 13 wherein said biasing device is a coiled spring.

21. An assembly as set forth in claim 13 further including electrical wires connected to said accelerometer and extending outwardly from said support housing for transmitting measurements.

* * * * *